(12) United States Patent
Suzuki et al.

(10) Patent No.: US 11,400,891 B2
(45) Date of Patent: Aug. 2, 2022

(54) WIPER CONTROL DEVICE

(71) Applicant: DENSO CORPORATION, Kariya (JP)

(72) Inventors: Hidenobu Suzuki, Kariya (JP); Yuta Doi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/961,501

(22) PCT Filed: Jan. 17, 2019

(86) PCT No.: PCT/JP2019/001299
§ 371 (c)(1),
(2) Date: Jul. 10, 2020

(87) PCT Pub. No.: WO2019/142867
PCT Pub. Date: Jul. 25, 2019

(65) Prior Publication Data
US 2020/0339070 A1    Oct. 29, 2020

(30) Foreign Application Priority Data

Jan. 18, 2018  (JP) .............................. JP2018-006366

(51) Int. Cl.
*B60S 1/08* (2006.01)
*B60S 1/24* (2006.01)

(52) U.S. Cl.
CPC .............. *B60S 1/0818* (2013.01); *B60S 1/24* (2013.01)

(58) Field of Classification Search
CPC .... B60S 1/4038; B60S 1/3806; B60S 1/3853; B60S 1/387; B60S 1/3874; B60S 1/3887; B60S 1/4003; B60S 1/4048; B60S 1/0896; B60S 1/0814; B60S 1/245
USPC ........................................................ 15/250.3
See application file for complete search history.

(56) References Cited

U.S. PATENT DOCUMENTS

2017/0361810 A1 * 12/2017 Ijima ........................ B60S 1/08

FOREIGN PATENT DOCUMENTS

| JP | 2007-126152 A | 5/2007 | |
|---|---|---|---|
| JP | 2008-296790 A | 12/2008 | |
| JP | 2008296790 A * | 12/2008 | |
| JP | 2011131778 A * | 7/2011 | |
| WO | WO-2016093314 A1 * | 6/2016 | ................ B60S 1/08 |

OTHER PUBLICATIONS

Mar. 26, 2019 International Search Report issued in International Patent Application No. PCT/JP2019/001299.

* cited by examiner

*Primary Examiner* — Katina N. Henson
(74) *Attorney, Agent, or Firm* — Oliff PLC

(57) ABSTRACT

A wiper control device that properly detects restriction of a wiper blade according to a travel distance of the wiper blade. When a state in which a rotation speed of an output shaft calculated from a rotation angle of the output shaft detected by a rotation angle sensor is equal to or slower than a speed threshold defined according to a travel distance of the wiper blade and in which a current detected by a current detector is equal to or larger than a current threshold continues for a predetermined determination period, a microcomputer stops a wiper motor or reverses a direction of a wiping action of the wiper blade.

13 Claims, 8 Drawing Sheets

WIPER CONTROL DEVICE

TECHNICAL FIELD

The present invention relates to a wiper control device.

BACKGROUND ART

A wiper device installed in vehicles includes wiper blades that perform a wiping action over a windshield glass (windshield), and such a wiping action may be inhibited by an obstacle such as a buildup of snow and may even be restricted (stopped) by such an obstacle. In such a case, in order to prevent a wiper motor that runs the wiper blades for the wiping action from being overloaded, processing may be performed to stop rotation of the wiper motor and further reverse a direction of the wiper blades at their stopped positions.

Japanese Patent Application Laid-Open No. 2007-126152 (Patent Document 1) and Japanese Patent Application Laid-Open No. 2008-296790 (Patent Document 2) each disclose a wiper device that, when decrease in the number of rotations of the wiper motor is detected, determines that a wiping action of wiper blades has been inhibited by an obstacle and the wiper blades have been restricted and stops rotation of the wiper motor and reverses a direction of the wiper blades at their stopped positions.

SUMMARY OF INVENTION

Technical Problem

However, the wiper device disclosed in each of Patent Documents 1 and 2 detects restriction of the wiper blades based on the same conditions, regardless of length of a travel distance of the wiper blades from a position at which they start the wiping action to a position at which they get restricted by the obstacle. When the travel distance of the wiper blades is short, the wiping speed of the wiper blades is slow as compared to when the travel distance is long. Thus, if a rotation speed threshold of the wiper motor that should be applied to cases in which the travel distance is long is applied to cases in which the travel distance is short, it can often lead to falsely detecting the wiper blades as being restricted.

In view of the above, an object of the present disclosure is to provide a wiper control device that properly detects restriction of the wiper blades according to the travel distance of the wiper blades.

Solution to Problem

To address the above problem, a first aspect of the present disclosure is a wiper control device including: a wiper motor configured to cause a wiper blade to perform a to-and-fro wiping action over a windshield; a rotation angle detector configured to detect a rotation angle of an output shaft of the wiper motor; a current detector configured to detect a current in the wiper motor; and a controller configured to control rotation of the wiper motor, and configured to, when a state in which a rotation speed of the output shaft obtained from a rotation angle detected by the rotation angle detector is equal to or slower than a speed threshold that is defined according to a travel distance of the wiper blade from a reference position in a to-and-fro wiping action and in which a current detected by the current detector is equal to or larger than a current threshold continues for a predetermined period during controlling the rotation of the wiper motor, stop the to-and-fro wiping action or reverse a direction of the to-and-fro wiping action.

As this wiper control device determines whether to stop the wiper motor by using a speed threshold that is defined according to the travel distance of the wiping action, the wiper control device can properly detect restriction of the wiper blade according to the travel distance thereof.

In the wiper control device according to a second aspect of the present disclosure, in the first aspect, a speed threshold used in a case in which the travel distance is long is set higher than a speed threshold used in a case in which the travel distance is short.

As the speed threshold used in a case in which the travel distance of the wiper blade is short is made lower than that used in a case in which the travel distance is long, this wiper control device can properly detect restriction of the wiper blade.

In the wiper control device according to a third aspect of the present disclosure, in the first or second aspect, the predetermined period is defined according to the travel distance.

As the predetermined period required for determination of restriction of the wiper blade is defined according to the travel distance of the wiper blade, this wiper control device can be prevented from falsely detecting restriction of the wiper blade.

In the wiper control device according to a fourth aspect of the present disclosure, in any one of the first to third aspects, a predetermined period used in a case in which the travel distance is long is set shorter than a predetermined period used in a case in which the travel distance is short.

As the predetermined period required for determination of restriction of the wiper blade is made longer in a case in which the travel distance of the wiper blade is short than in a case in which the travel distance is long, this wiper control device can be prevented from falsely detecting restriction of the wiper blade.

In the wiper control device according to a fifth aspect of the present disclosure, in any one of the first to fourth aspects, when the wiper blade reaches a reversal position or a stowed position after the controller reverses the direction of the wiper blade, the controller is configured to stop controlling the rotation of the wiper motor.

This wiper control device can retract the wiper blade to either the reversal position or the stowed position once the wiper blade has been restricted.

DESCRIPTION OF EMBODIMENTS

Figure 1:
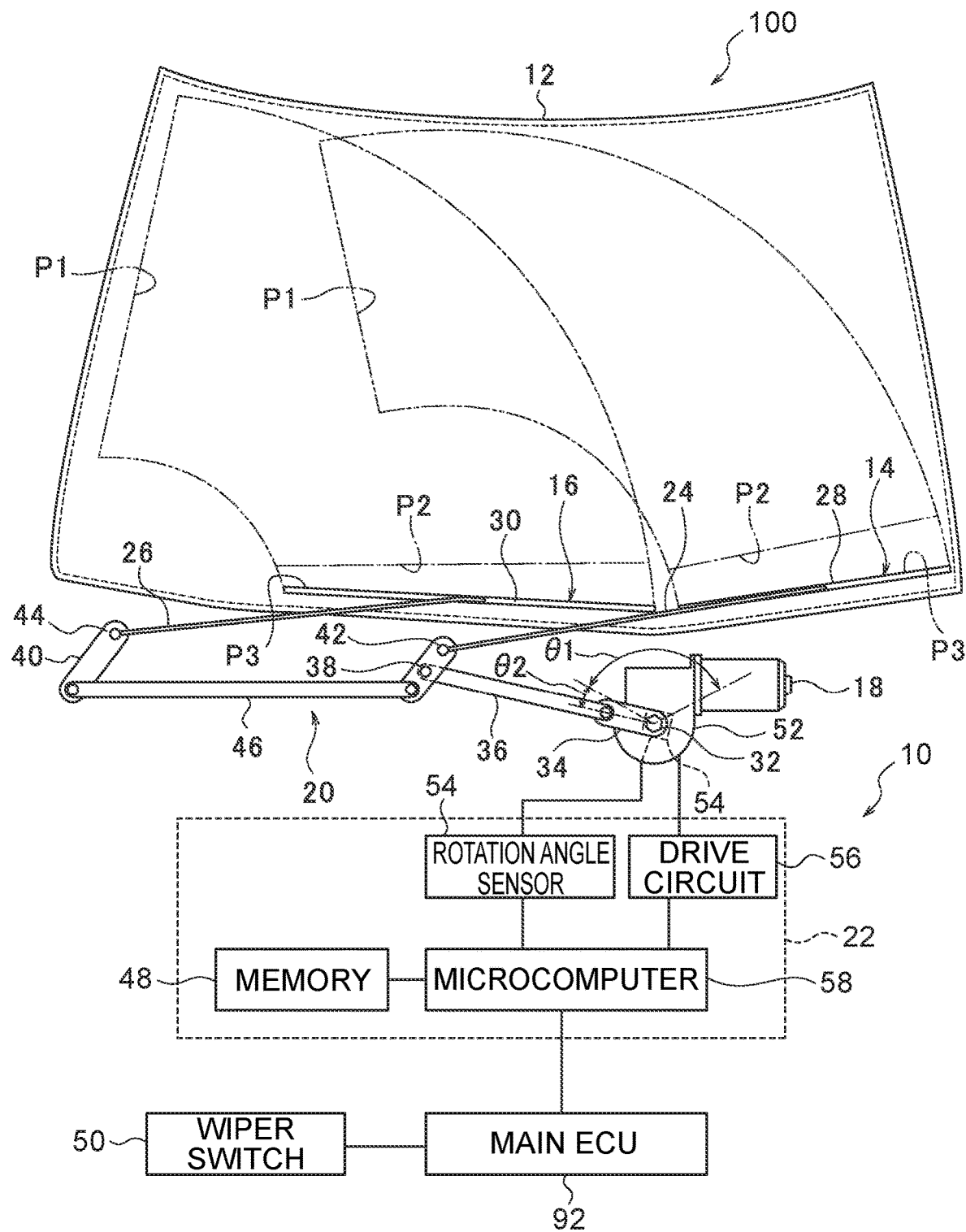
FIG. 1 is a schematic diagram illustrating a configuration of a wiper device including a wiper control device according to an exemplary embodiment of the present disclosure.

FIG. 1 is a schematic diagram illustrating a configuration of a wiper device 100 including a wiper control device 10 according to an exemplary embodiment. The wiper device 100 is, for example, a device for wiping a windshield glass 12 installed to a vehicle such as a passenger car. The wiper device 100 includes a pair of wipers 14, 16, a wiper motor 18, a link mechanism 20, and the wiper control device 10.

The wipers 14, 16 are composed of respective wiper arms 24, 26 and respective wiper blades 28, 30. Proximal ends of the wiper arms 24, 26 are respectively fixed to pivot shafts 42, 44 (described later), and the wiper blades 28, 30 are respectively fixed to distal ends of the wiper arms 24, 26.

In the wipers 14, 16, the wiper blades 28, 30 travel to and fro over the windshield glass 12 accompanying movement of the respective wiper arms 24, 26 and thus wipe the windshield glass 12.

The wiper motor 18 includes an output shaft 32 via a speed reduction mechanism 52 mainly composed of a worm gear. The output shaft 32 is capable of rotating in forward and reverse directions. The link mechanism 20 includes a crank arm 34, a first link rod 36, a pair of pivot levers 38, 40, the pair of pivot shafts 42, 44, and a second link rod 46.

The crank arm 34 is fixed at its one end to the output shaft 32 and operably coupled at its other end to one end of the first link rod 36. The first link rod 36 is operably coupled at its other end to the pivot lever 38 at a location nearer to one end of the pivot lever 38 than to the other end thereof where the pivot shaft 42 is located. The second link rod 46 is operably coupled at its respective ends to the one end of the pivot lever 38 opposite from the other end thereof where the pivot shaft 42 is located and to an end of the pivot lever 40 corresponding to that one end of the pivot lever 38.

The pivot shafts 42, 44 are operably supported by pivot holders (not shown) provided on a vehicle body. The wiper arms 24, 26 are respectively fixed via the pivot shafts 42, 44 to the ends of the pivot levers 38, 40 where the pivot shafts 42, 44 are respectively located.

In the wiper device 100 including the wiper control device 10 according to the present exemplary embodiment, when the output shaft 32 is rotated in forward and reverse directions by a rotation angle θ1 within a predetermined range, the rotation force of the output shaft 32 is transmitted via the link mechanism 20 to the wiper arms 24, 26 and causes the wiper arms 24, 26 to move to and fro, which is accompanied by to-and-fro movement of the wiper blades 28, 30 over the windshield glass 12 between a lower reversal position P2 and an upper reversal position P1. By way of example, the value of the rotation angle θ1 is 140° in the present exemplary embodiment, though the rotation angle θ1 may take various values according to factors such as the configuration of the link mechanism of the wiper control device 10.

As shown in FIG. 1, the wiper device 100 including the wiper control device 10 according to the present exemplary embodiment is configured such that with the wiper blades 28, 30 positioned at a stowed position P3, the crank arm 34 and the first link rod 36 form a straight line.

The stowed position P3 is located below the lower reversal position P2. Rotation of the output shaft 32 by a rotation angle θ2 with the wiper blades 28, 30 positioned at the lower reversal position P2 causes the wiper blades 28, 30 to move to the stowed position P3. By way of example, the value of the rotation angle θ2 is 10° in the present exemplary embodiment, though the rotation angle θ2 may take various values according to factors such as the configuration of the link mechanism of the wiper control device 10.

It should be noted that when the rotation angle θ2 is zero, the lower reversal position P2 coincides with the stowed position P3, and the wiper blades 28, 30 are stopped and stowed at the lower reversal position P2.

A wiper motor control circuit 22 for controlling rotation of the wiper motor 18 is connected to the wiper motor 18. The wiper motor control circuit 22 according to the present exemplary embodiment includes a microcomputer 58 and a drive circuit 56 that generates a voltage to be applied to a coil of the wiper motor 18.

The microcomputer 58 of the wiper motor control circuit 22 controls rotation speed of the wiper motor 18 based on detection results from a rotation angle sensor 54 that detects rotation speed and rotation angle of the output shaft 32 of the wiper motor 18. The rotation angle sensor 54 is disposed inside the speed reduction mechanism 52 of the wiper motor 18 and converts magnetic fields (magnetic forces) of a sensor magnet rotating together with the output shaft 32 into electric currents before detecting the same.

The wiper motor 18 according to the present exemplary embodiment includes the speed reduction mechanism 52 as described above, and thus the rotation speed and rotation angle of the output shaft 32 are not identical to the rotation speed and rotation angle of a wiper motor main body. However, because the wiper motor main body and the speed reduction mechanism 52 are formed integrally and inseparably, the rotation speed and rotation angle of the output shaft 32 is hereinafter regarded as the rotation speed and rotation angle of the wiper motor 18.

The microcomputer 58 is capable of calculating positions of the wiper blades 28, 30 on the windshield glass 12 and the rotation speed of the output shaft 32 from the rotation angle of the output shaft 32 detected by the rotation angle sensor 54, and controls the drive circuit 56 such that the rotation speed of the output shaft 32 changes according to the calculated positions. The drive circuit 56 is a circuit that generates, under control of the wiper motor control circuit 22, a voltage to be applied to the wiper motor 18; the drive circuit 56 generates such voltage to be applied to the wiper motor 18 by switching power from a vehicle battery as a power source. Data regarding control over the drive circuit 56 are stored in a memory 48.

A wiper switch 50 is connected to the microcomputer 58 of the wiper motor control circuit 22 via a main electronic control unit (ECU) 92 that controls a vehicle engine and the like. The wiper switch 50 is a switch for switching on and off the power supply from the vehicle battery to the wiper motor 18. The wiper switch 50 can be switched between a low-speed operation mode selection position (LOW) to operate the wiper blades 28, 30 at a low speed, a high-speed operation mode selection position (HIGH) to operate the wiper blades 28, 30 at a high speed, an intermittent operation mode selection position (INT) to operate the wiper blades 28, 30 intermittently at certain intervals, an automatic operation mode selection position (AUTO) to operate the wiper blades 28, 30 in response to a rain sensor (not shown) detecting waterdrops, and a stop mode selection position (OFF). The wiper switch 50 also outputs command signals for rotating the wiper motor 18 according to each selected mode position to the microcomputer 58 via the main ECU 92. For example, the wiper motor 18 is rotated at a high speed with the wiper switch 50 at the high-speed operation mode selection position, is rotated at a low speed with the wiper switch 50 at low-speed operation mode selection position, and is rotated intermittently with the wiper switch 50 at the intermittent operation mode selection position.

In response to the signals output from the wiper switch 50 according to each selected mode position being input to the microcomputer 58 via the main ECU 92, the microcomputer 58 performs control according to the command signals from the wiper switch 50. Specifically, based on the command signals from the wiper switch 50, the microcomputer 58 controls a voltage to be applied to the wiper motor 18 such that the wiper blades 28, 30 operate at a desired to-and-fro wiping cycle.

Figure 2:
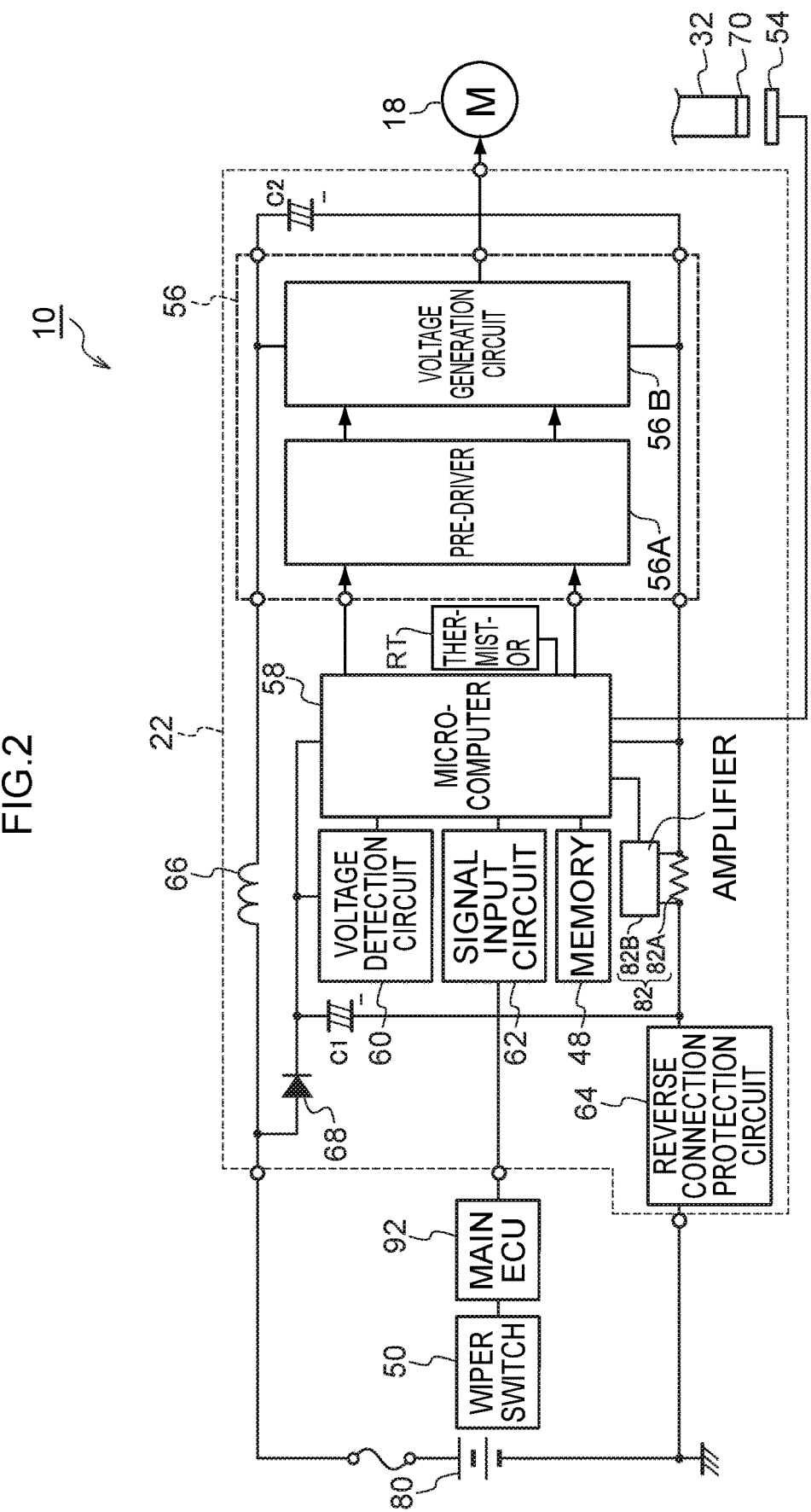
FIG. 2 is a block diagram schematically illustrating an example of a configuration of the wiper control device according to the exemplary embodiment of the present disclosure.

FIG. 2 is a block diagram schematically illustrating an example of a configuration of the wiper control device 10 according to the present exemplary embodiment. The wiper control device 10 shown in FIG. 2 includes the drive circuit 56 for generating a voltage to be applied to a coil terminal of the wiper motor 18, and the wiper motor control circuit 22 including the microcomputer 58 for controlling turning on and off of switching elements that constitute the drive circuit 56. The microcomputer 58 is supplied with power of a battery 80 via a diode 68. A voltage detection circuit 60 provided between the diode 68 and the microcomputer 58 detects a voltage of the power supplied from the battery 80 and outputs the detection results to the microcomputer 58. An electrolytic capacitor C1 is provided with its one end connected between the diode 68 and the microcomputer 58 and with its other end (−) grounded. The electrolytic capacitor C1 is a capacitor for stabilizing the power supply to the microcomputer 58. The electrolytic capacitor C1 protects the microcomputer 58 by, for example, accumulating sudden high voltages such as surge voltages and discharging them to a ground area.

Command signals for designating the rotation speed of the wiper motor 18 are input from the wiper switch 50 to the microcomputer 58 via the main ECU 92 and a signal input circuit 62.

The rotation angle sensor 54 for detecting a magnetic field of a sensor magnet 70 that changes according to rotation of the output shaft 32 is connected to the microcomputer 58. The microcomputer 58 identifies positions of the wiper blade 28, 30 on the windshield glass 12 by calculating the rotation angle of the output shaft 32 based on signals output from the rotation angle sensor 54.

With reference to data of the rotation speed of the wiper motor 18 defined according to positions of the wiper blades 28, 30 and stored in the memory 48, the microcomputer 58 controls the drive circuit 56 such that the wiper motor 18 is rotated by the number of rotations according to the identified positions of the wiper blades 28, 30. These data are stored in the memory 48.

The drive circuit 56 includes a pre-driver 56A and a voltage generation circuit 56B. Based on control signals for the drive circuit 56 output from the microcomputer 58, the pre-driver 56A generates drive signals to turn on and off switching elements of the voltage generation circuit 56B. The voltage generation circuit 56B operates the switching elements according to the drive signals output from the pre-driver 56A and generates a voltage to be applied to the coil of the wiper motor 18.

In the present exemplary embodiment, a reverse connection protection circuit 64 and a noise prevention coil 66 are provided between the battery 80 as a power source and the drive circuit 56, and an electrolytic capacitor C2 is provided in parallel to the drive circuit 56. The noise prevention coil 66 is an element for suppressing noise generated by switching of the drive circuit 56.

The electrolytic capacitor C2 is an element that mitigates noise generated from the drive circuit 56 and also prevents an excessive current from being input to the drive circuit 56 by accumulating sudden high voltages such as surge voltages and discharging them to a ground area.

The reverse connection protection circuit 64 is a circuit that protects the elements constituting the wiper control device 10 when positive and negative terminals of the battery 80 are connected in an opposite manner to that shown in FIG. 2. By way of example, the reverse connection protection circuit 64 is composed of a so-called diode-connected FET whose drain and gate are connected to each other.

Mounted on a substrate of the wiper control device 10 according to the present exemplary embodiment is a chip thermistor RT that detects a temperature of the substrate as a resistance value. By way of example, the chip thermistor RT used in the present exemplary embodiment is a negative temperature coefficient (NTC) thermistor whose resistance decreases with increase in temperature. It should be noted that a positive temperature coefficient (PTC) thermistor whose resistance increases with increase in temperature may also be used when combined with an inverting circuit.

The chip thermistor RT constitutes a kind of voltage divider circuit, and a voltage that changes based on a resistance value of the chip thermistor RT is output from an output terminal of the voltage divider circuit constituted by the chip thermistor RT. The microcomputer 58 calculates a temperature of the substrate of the wiper control device 10 based on the voltage output from the output terminal of the voltage divider circuit constituted by the chip thermistor RT, and when the temperature exceeds a predetermined threshold temperature, performs processing to stop operation of the wiper control device 10.

A current detector 82 for detecting a current (motor current) in the coil of the wiper motor 18 and in the voltage generation circuit 56B is provided between the battery 80 and sources of the respective switching elements constituting the voltage generation circuit 56B. The current detector 82 includes a shunt resistor 82A with a resistance value of about 0.2 mΩ to several Ω and an amplifier 82B. The amplifier 82B detects a potential difference between two terminals of the shunt resistor 82A that changes according to the current in the voltage generation circuit 56B, and amplifies a signal of the detected potential difference. The microcomputer 58 calculates a current value of the motor current based on the signal output from the amplifier 82B and, when the current value exceeds a predetermined threshold, performs processing to stop the voltage generation circuit 56B from generating voltages and to stop the wiper motor 18 from rotating, which will be described later.

Figure 3A:
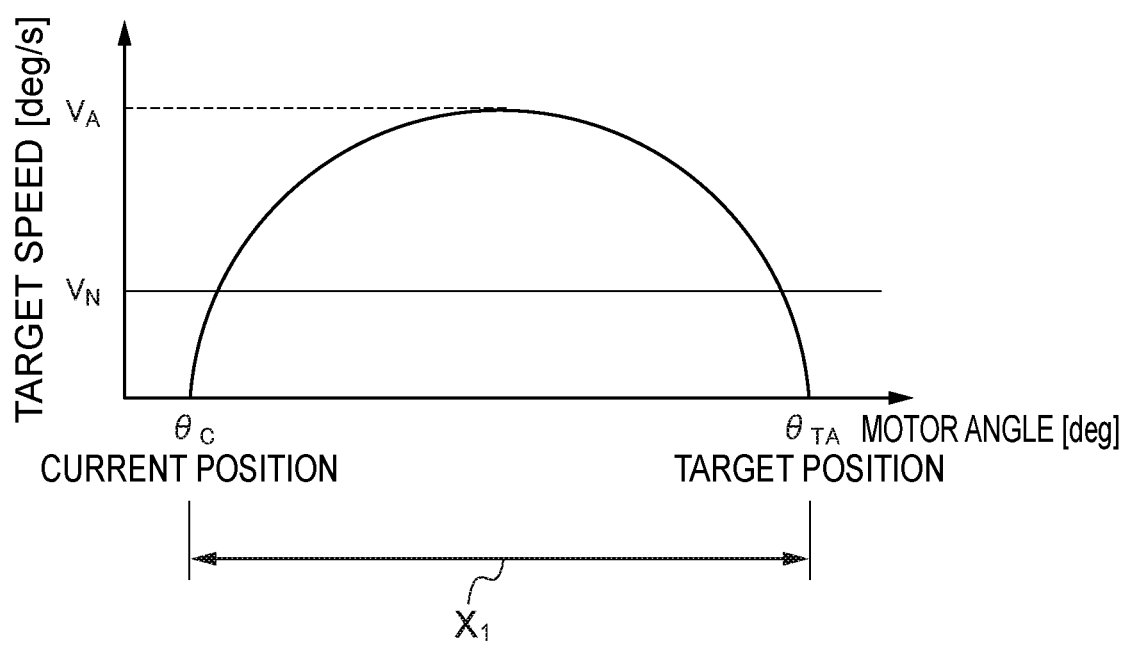
FIG. 3A is an explanatory diagram illustrating an example of a target speed of a wiping action of wiper blades that changes according to a target travel distance, in a case in which the target travel distance is long.
Figure 3B:
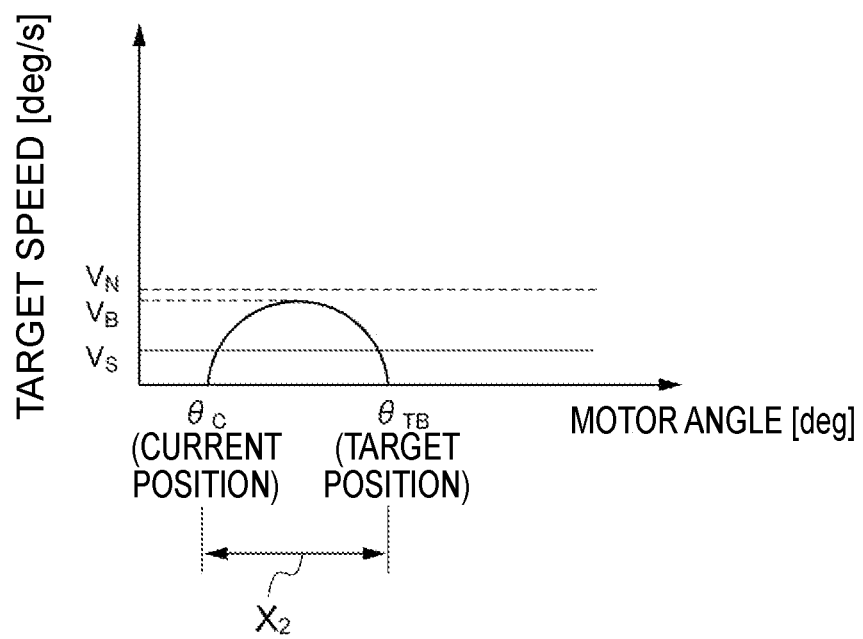
FIG. 3B is an explanatory diagram illustrating an example of a target speed of a wiping action of the wiper blades that changes according to a target travel distance, in a case in which the target travel distance is short.

FIGS. 3A and 3B are explanatory diagrams each illustrating an example of a target speed of a wiping action of the wiper blades 28, 30 that changes according to target travel distances $X_1$, $X_2$, where FIG. 3A shows a case in which the target travel distance $X_1$ is long, and FIG. 3B shows a case in which the target travel distance $X_2$ is short.

The horizontal axis in each of FIGS. 3A and 3B refers to a motor angle (deg) that is a rotation angle of the output shaft 32 of the wiper motor 18 indicative of positions of the wiper blades 28, 30 on the windshield glass 12. In the present exemplary embodiment, an actual motor angle can be detected by the rotation angle sensor 54.

The vertical axis in each of FIGS. 3A and 3B refers to a target speed that is a target wiping speed of the wiper blades 28, 30. The target speed is defined as an angular speed (deg/s) of the output shaft 32, but this is by way of example and may also be defined as a rotation speed (rpm).

As described above, in the present exemplary embodiment, the microcomputer 58 refers to the data of the rotation speed of the wiper motor 18 defined according to positions of the wiper blades 28, 30 and stored in the memory 48 and controls the drive circuit 56 such that the wiper motor 18 is rotated by the number of rotations according to the identified positions of the wiper blades 28, 30. While the data may take various forms, by way of example, the motor angle indicative of positions of the wiper blades 28, 30 is placed on the horizontal axis and the target speed of the rotation speed of the output shaft 32 is placed on the vertical axis, as shown in FIGS. 3A and 3B.

A current position $\theta_C$ shown in FIG. 3A is a position at which the wiper blades 28, 30 start a wiping action, which is for example the lower reversal position P2. When the current position $\theta_C$ is the lower reversal position P2, a target position $\theta_{TA}$ shown in FIG. 3A is the upper reversal position P1, for example.

As shown in FIG. 3A, the target speed takes its maximum value $V_A$ generally at a midpoint between the current position $\theta_C$ and the target position $\theta_{TA}$. A threshold $V_N$ shown on the vertical axis in FIG. 3A is a target speed threshold by which it is determined whether the wiper blades 28, 30 have been restricted. When the rotation speed of the output shaft 32 calculated based on the signal output from the rotation angle sensor 54 is at or below the speed threshold $V_N$, the microcomputer 58 basically determines that the wiper blades 28, 30 have been restricted by an obstacle.

While in FIG. 3A the target speed is at or below the speed threshold $V_N$ near the current position $\theta_C$ and near the target position $\theta_{TA}$, the microcomputer 58 does not determine that the wiper blades 28, 30 have been restricted by an obstacle provided that the positions of the wiper blades 28, 30 (motor angle) and the rotation speed of the output shaft 32 calculated based on the signal output from the rotation angle sensor 54 correspond to the target speed according to the motor angle shown in FIG. 3A.

The current position shown $\theta_C$ shown in FIG. 3B is the lower reversal position P2, for example. When the current position $\theta_C$ is the lower reversal position P2, a target position $\theta_{TB}$ shown in FIG. 3B is the stowed position P3, for example.

When the target travel distance $X_2$ is short as shown in FIG. 3B, a maximum value VB of the target speed becomes smaller than shown in FIG. 3A. Since accelerating or decelerating the stopped wiper motor 18 requires a reasonable amount of time, the maximum value VB of the target speed in the data of the rotation speed of the wiper motor 18 defined according to positions of the wiper blades 28, 30 decreases with decrease in the target travel distance $X_2$, as compared with when the target travel distance $X_1$ is long.

As shown in FIG. 3B, the maximum value VB may fall to or below the speed threshold $V_N$ when the target travel distance $X_2$ is extremely short. In such a case, the wiper blade 28, 30 may be falsely detected as being restricted unless a speed threshold $V_S$ lower than the speed threshold $V_N$ is set according to the target travel distance $X_2$.

Figure 4:
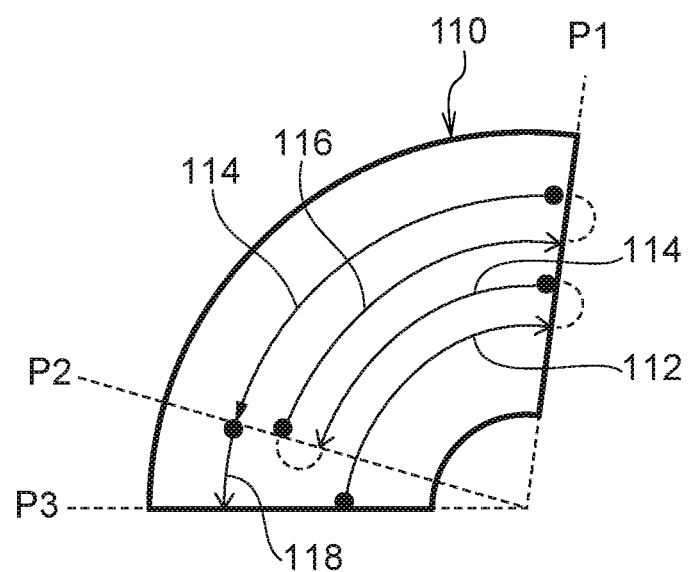
FIG. 4 is an explanatory diagram illustrating an example of a wiping action performed over a windshield glass in a wiping area between an upper reversal position and a stowed position, in the wiper control device according to the exemplary embodiment of the present disclosure.

FIG. 4 is an explanatory diagram illustrating an example of a wiping action performed over the windshield glass 12 in a wiping area 110 between the upper reversal position P1 and the stowed position P3. As shown in FIG. 4, when the wiper switch 50 is turned on, the wiper blades 28, 30 perform a wiping action 112 from the stowed position P3 to the upper reversal position P1. Upon reaching the upper reversal position P1, the wiper blades 28, 30 reverse their direction at the upper reversal position P1, performing a wiping action 114 from the upper reversal position P1 to the lower reversal position P2.

Upon reaching the lower reversal position P2, the wiper blades 28, 30 reverse their direction at the lower reversal position P2, performing a wiping action 116 from the lower reversal position P2 to the upper reversal position P1.

The wiping actions 112, 114, 116 are those performed when the target travel distance $X_1$ is long as shown in FIG. 3A, and accordingly the speed threshold $V_N$ is applied to detect restriction of the wiper blades 28, 30.

When the wiper switch 50 is turned off during the wiping actions 112, 114, 116, the wiper blades 28, 30 move to the lower reversal position P2 by the wiping action 114 and then perform a wiping action 118, whereby the wiper blades 28, 30 move from the lower reversal position P2 to the stowed position P3 and get stowed at the stowed position P3.

The wiping action 118 is one performed when the target travel distance $X_2$ is short as shown in FIG. 3B, and accordingly the speed threshold $V_S$ is applied to detect restriction of the wiper blades 28, 30.

Figure 5:
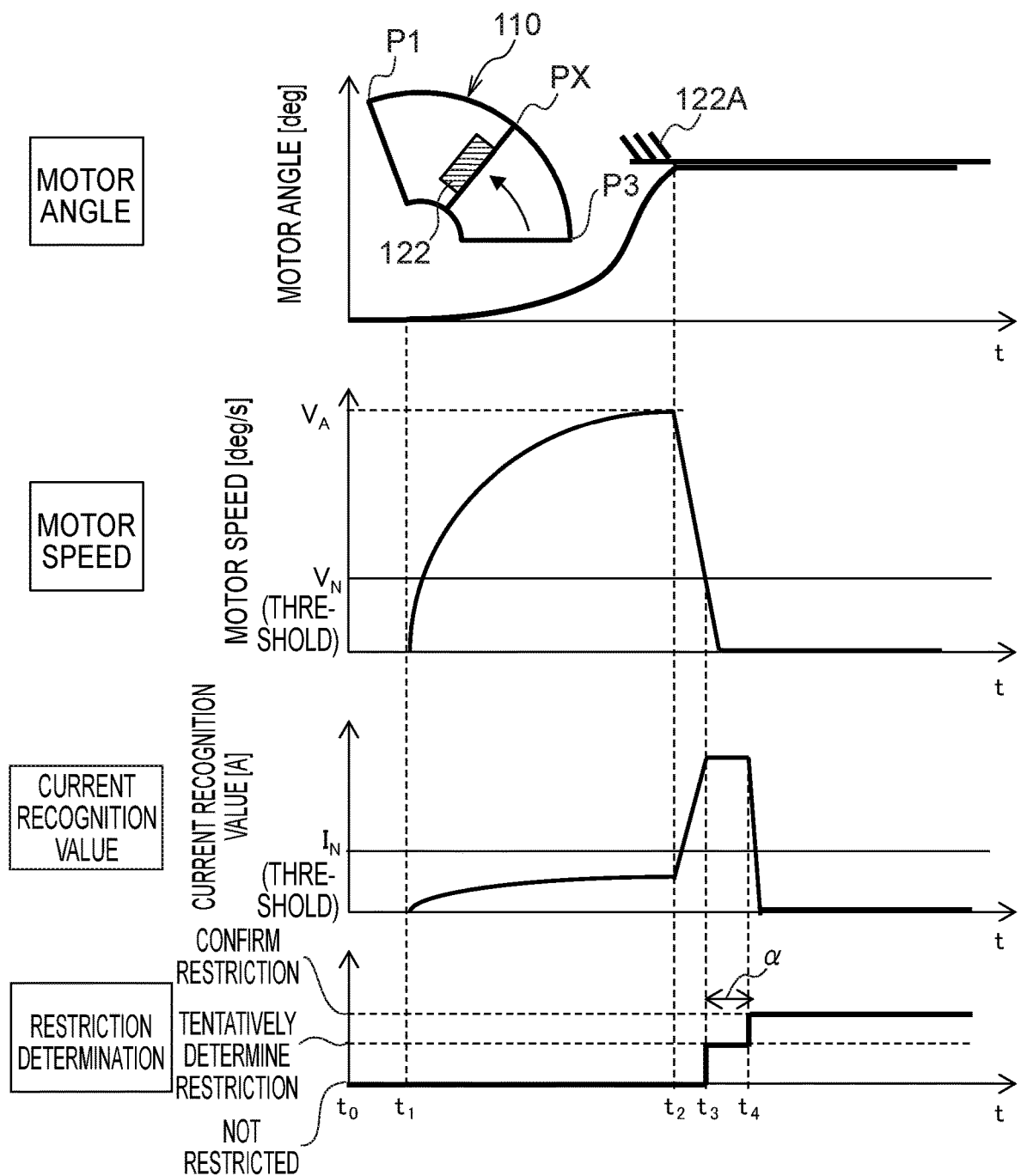
FIG. 5 is an explanatory diagram illustrating an example of how the wiper control device according to the exemplary embodiment of the present disclosure operates when the wiper blades are restricted by an obstacle.

FIG. 5 is an explanatory diagram illustrating an example of how the wiper control device 10 according to the exemplary embodiment operates when the wiper blades 28, 30 are restricted by an obstacle 122. FIG. 5 shows the motor angle indicative of positions of the wiper blades 28, 30, the motor speed as the angular speed of the output shaft 32, a current recognition value from the current detector 82, and the restriction determination made by the microcomputer 58 in a case in which the wiper blades 28, 30 start a wiping action from the stowed position P3 at time $t_1$ following time to and then the wiping action of the wiper blades 28, 30 encounters blockage 122A by an obstacle 122 at a position PX at time $t_2$.

In FIG. 5, the wiper blades 28, 30 travel in one direction from the stowed position P3 to the position PX that is near the midpoint between the upper reversal position P1 and the stowed position P3, and accordingly this travel distance of the wiper blades 28, 30 can be classified as being a long travel distance in the present exemplary embodiment. In the present exemplary embodiment, the microcomputer 58 calculates a travel distance of the wiper blades 28, 30 based on the signal output from the rotation angle sensor 54 and, according to the calculated travel distance, selects the threshold used for determination of whether the wiper blades 28, 30 have been restricted. Since the travel distance of the wiper blades 28, 30 is long in the case shown in FIG. 5, the speed threshold $V_N$ shown in FIG. 3A is used as a motor speed threshold.

When the current recognition value reaches or exceeds a current threshold IN after time $t_2$ and the motor speed falls to or below the speed threshold $V_N$ at time $t_3$, the microcomputer 58 tentatively determines that the wiper blades 28, 30 have been restricted. Further, when the state in which the current recognition value is at or above the current threshold IN and the motor speed is at or below the speed threshold $V_N$ continues for, or longer than, a determination period α that lasts from time $t_3$ to time $t_4$, the microcomputer 58 confirms that the wiper blades 28, 30 have been restricted. Upon confirmation that the wiper blades 28, 30 have been restricted, in order to avoid overloading the wiper motor 18, the microcomputer 58 stops voltage generation by the voltage generation circuit 56B to stop power supply to the wiper motor 18, or stops the wiper motor 18 at the position where the wiper blades 28, 30 have been restricted and then reverses the output shaft rotation of the wiper motor 18 to reverse the direction of the wiper blades 28, 30 at that position. Once the wiper blades 28, 30 having their direction reversed have reached any one of the upper reversal position P1, the lower reversal position P2, and the stowed position P3, the microcomputer 58 stops rotation of the wiper motor 18.

Figure 6:
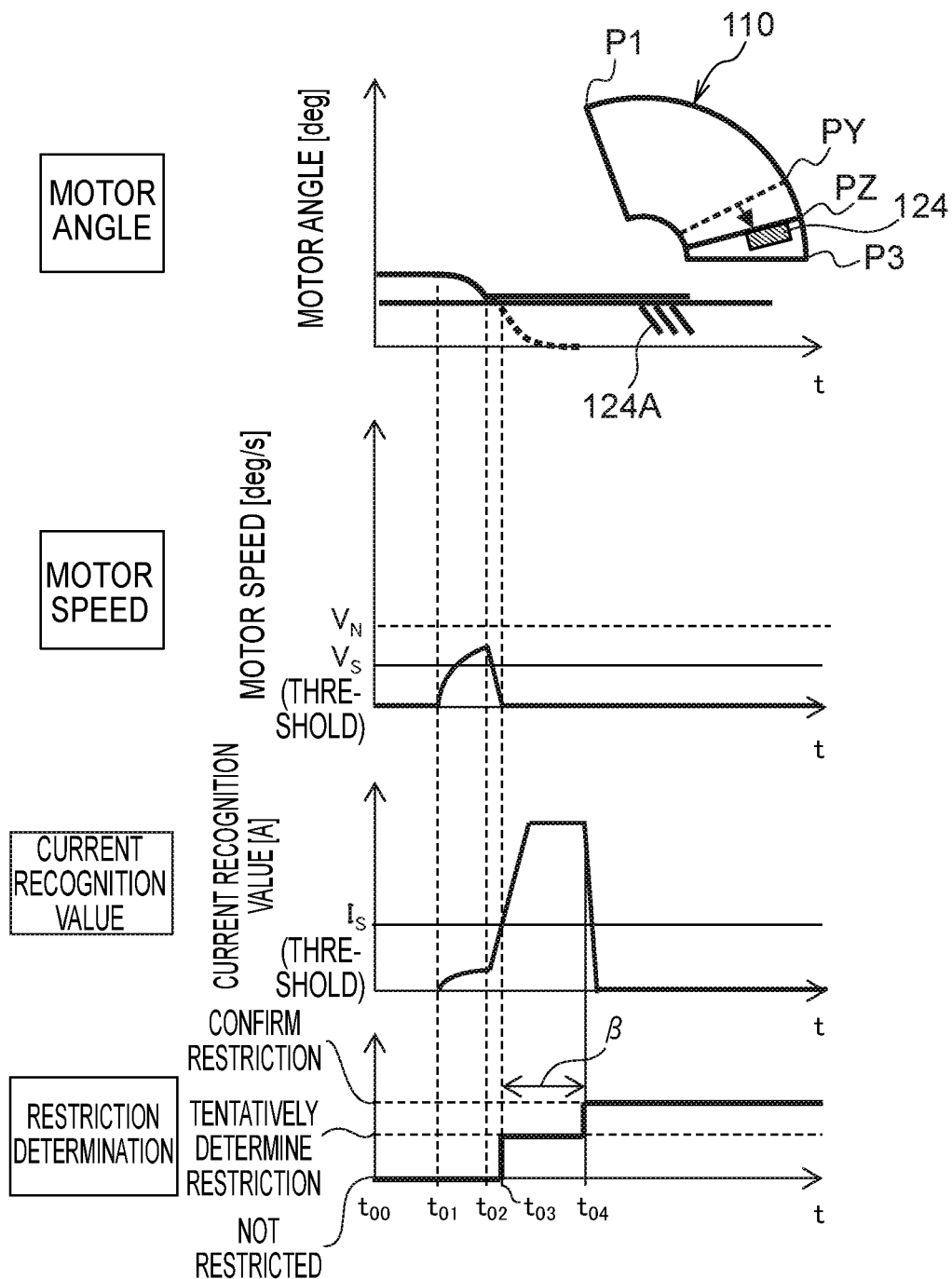
FIG. 6 is an explanatory diagram illustrating another example of how the wiper control device according to the exemplary embodiment of the present disclosure operates when the wiper blades are restricted by an obstacle.

FIG. 6 is an explanatory diagram illustrating another example of how the wiper control device 10 according to the present exemplary embodiment operates when the wiper blades 28, 30 are restricted by an obstacle 124. FIG. 6 shows the motor angle, the motor speed, the current recognition value, and the restriction determination made by the microcomputer 58 in a case in which the wiper blades 28, 30 start a wiping action in one direction from a position PY to the stowed position P3 at time $t_{01}$ following time too and then the wiping action of the wiper blades 28, 30 encounters blockage 124A by an obstacle 124 at a position PZ at time $t_{02}$.

In the case shown in FIG. 6, the travel distance of the wiper blades 28, 30 is short than in the case shown in FIG. 5. When the travel distance of the wiper blades 28, 30 calculated by the microcomputer 58 based on the signal output from the rotation angle sensor 54 is shorter than a predetermined distance threshold, the microcomputer 58 selects thresholds different from those used when the travel distance is longer than the distance threshold. For example, since the travel distance of the wiper blades 28, 30 is short in the case shown in FIG. 6, the speed threshold $V_S$ shown in FIG. 3B is used as the motor speed threshold. Also, in the case shown in FIG. 6, a current threshold $I_S$ is used instead of the current threshold IN shown in FIG. 5. While each of the current thresholds $I_N$, $I_S$ is defined according to specifications of the wiper motor 18, they may be the same value.

When the motor speed falls to or below the speed threshold $V_S$ after time toe and the current recognition value reaches or exceeds the current threshold $I_S$ at time $t_{03}$, the microcomputer 58 tentatively determines that the wiper blades 28, 30 have been restricted at time $t_{03}$. Further, when the state in which the current recognition value is at or above current threshold $I_S$ and the motor speed is at or below the speed threshold $V_S$ continues for, or longer than, a determination period β that lasts from time $t_{03}$ to time too, the microcomputer 58 confirms that the wiper blades 28, 30 have been restricted. Upon confirmation that the wiper blades 28, 30 have been restricted, in order to avoid overloading the wiper motor 18, the microcomputer 58 stops voltage generation by the voltage generation circuit 56B to stop power supply to the wiper motor 18, or stops the wiper motor 18 at the position where the wiper blades 28, 30 have been restricted and then reverses the output shaft rotation of the wiper motor 18 to reverse the direction of the wiper blades 28, 30 at that position. Once the wiper blades 28, 30 having their direction reversed have reached either reversal position and the like, the microcomputer 58 stops rotation of the wiper motor 18.

Since in the case shown in FIG. 6 the speed threshold $V_S$ slower than the speed threshold $V_N$ is used for determination of whether the wiper blades 28, 30 have been restricted, the determination period β is made longer than the determination period α in order to avoid false determination. Thresholds and determination periods used for the determination of restriction of the wiper blades 28, 30 vary according to specifications of the wiper device 100 and the wiper motor 18, and the speed thresholds $V_N$, $V_S$, the current thresholds $I_N$, $I_S$, the determination periods α, β, and a distance threshold XT (described later) are each stored in a storage device such as the memory 48. It should be noted that the determination periods α, β are provided for preventing the wiper blades 28, 30 from being falsely detected as being restricted, and thus they need not be set when such false detection is unlikely to occur.

Figure 7:
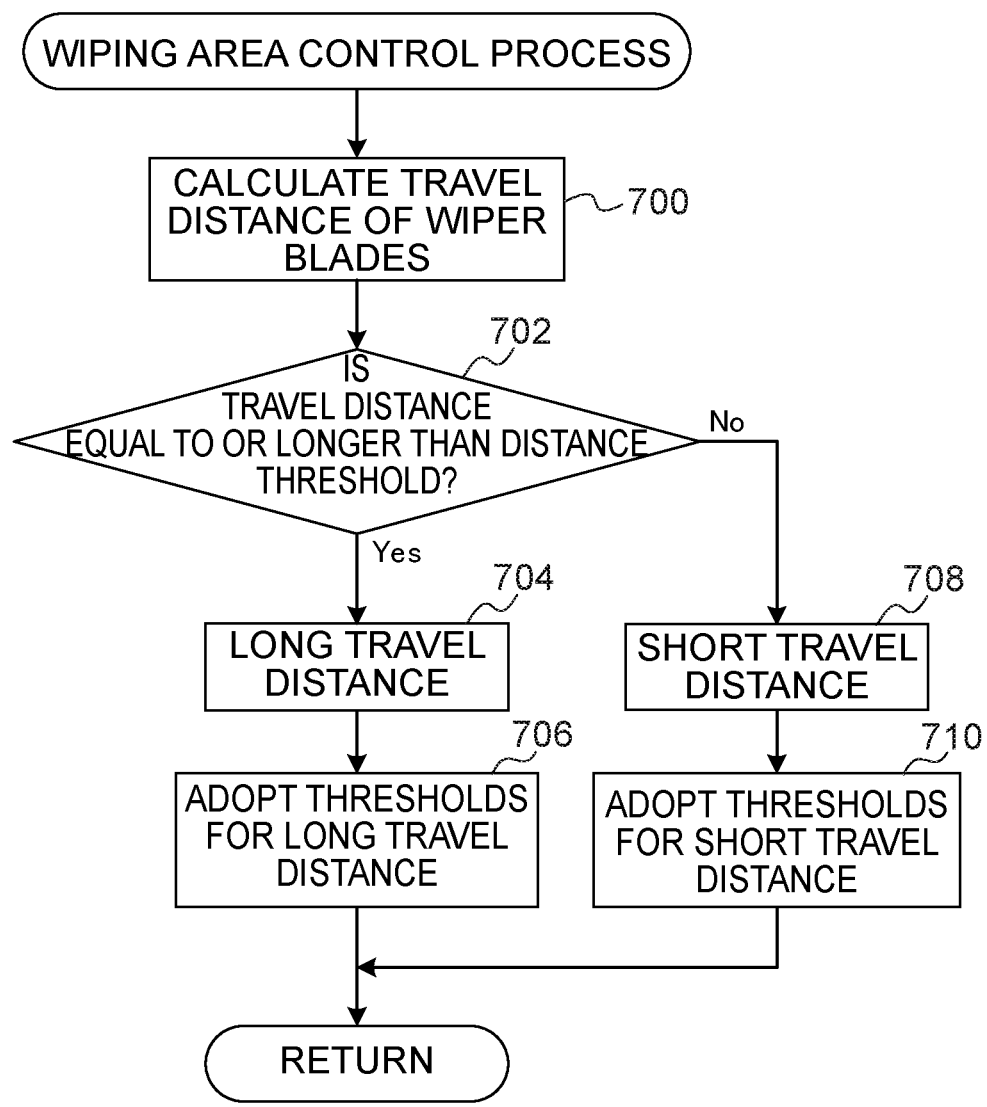
FIG. 7 is a flowchart illustrating an example of a wiping area control process by the wiper control device according to the exemplary embodiment of the present disclosure.

FIG. 7 is a flowchart illustrating an example of a wiping area control process by the wiper control device 10 according to the present exemplary embodiment. At step 700, the travel distance of the wiper blades 28, 30 from a position at which they start a wiping action is calculated based on the signal output from the rotation angle sensor 54.

At step 702, determination is made as to whether the travel distance of the wiper blades 28, 30 calculated at step 700 is equal to or longer than the distance threshold XT.

If the travel distance of the wiper blades 28, 30 is determined to be equal to or longer than the distance threshold XT at step 702, the wiper blades 28, 30 are recognized as traveling a long distance at step 704, and the speed threshold $V_N$, the current threshold $I_N$, and the determination period α are adopted at step 706, after which the process returns.

If the travel distance of the wiper blades 28, 30 is determined to be shorter than the distance threshold XT at step 702, the wiper blades 28, 30 are recognized as traveling a short distance at step 708, and the speed threshold $V_S$, the current threshold $I_S$, and the determination period β are adopted at step 710, after which the process returns.

According to the present exemplary embodiment, as described above, if the travel distance of the wiper blades 28, 30 is equal to or longer than the distance threshold XT, the thresholds for the long travel distance are used, and if the travel distance of the wiper blades 28, 30 is shorter than the distance threshold XT, the thresholds for the short travel distance are used. This allows to properly detect restriction of the wiper blades 28, 30 according to their travel distance.

While in the present exemplary embodiment the length of travel distance of the wiper blades 28, 30 is determined based on the single distance threshold XT, multiple distance thresholds may be used to determine the length of travel distance of the wiper blades 28, 30 by multiple scales, and determination as to whether the wiper blades 28, 30 have been restricted or not and whether the wiper motor 18 should be stopped or not may be made based on a speed threshold, a current threshold, and a determination period according to each determined travel distance.

The disclosure of Japanese Patent Application No. 2018-006366 is incorporated herein by reference in its entirety.

All documents, patent applications, and technical standards described in the present description are incorporated herein by reference to the same extent as in the case in which each document, patent application, and technical standard is specifically and individually described to be incorporated by reference.

The invention claimed is:
1. A wiper control device comprising:
  a wiper motor configured to cause a wiper blade to perform a to-and-fro wiping action over a windshield;

a rotation angle detector configured to detect a rotation angle of an output shaft of the wiper motor;

a current detector configured to detect a current in the wiper motor; and a controller configured to:

calculate, based on a signal output from the rotation angle detector, a travel distance of the wiper blade from a reference position at which the wiper blade starts a to-and-fro wiping action;

control rotation of the wiper motor based on the calculated travel distance of the wiper blade; and when a rotation speed of the output shaft obtained from a rotation angle detected by the rotation angle detector is less than or equal to a speed threshold that is defined according to the travel distance of the wiper blade from the reference position in the to-and-fro wiping action, and when a current detected by the current detector is greater than or equal to a current threshold for a predetermined period during controlling the rotation of the wiper motor, stop the to-and-fro wiping action or reverse a direction of the to-and-fro wiping action.

2. The wiper control device of claim 1, wherein when the travel distance of the wiper blade is greater than or equal to a distance threshold, then the travel distance is long, when the travel distance of the wiper blade is less than the distance threshold, then the travel distance is short, and a speed threshold used in a case in which the travel distance of the wiper blade is long is set higher than a speed threshold used in a case in which the travel distance of the wiper blade is short.

3. The wiper control device of claim 1, wherein the predetermined period is defined according to the travel distance of the wiper blade.

4. The wiper control device of claim 2, wherein the predetermined period is defined according to the travel distance of the wiper blade.

5. The wiper control device of claim 1, wherein when the travel distance of the wiper blade is greater than or equal to a distance threshold, then the travel distance is long, when the travel distance of the wiper blade is less than the distance threshold, then the travel distance is short, and a predetermined period used in a case in which the travel distance of the wiper blade is long is set shorter than a predetermined period used in a case in which the travel distance of the wiper blade is short.

6. The wiper control device of claim 2, wherein when the travel distance of the wiper blade is greater than or equal to a distance threshold, then the travel distance is long, when the travel distance of the wiper blade is less than the distance threshold, then the travel distance is short, and a predetermined period used in a case in which the travel distance of the wiper blade is long is set shorter than a predetermined period used in a case in which the travel distance of the wiper blade is short.

7. The wiper control device of claim 3, wherein when the travel distance of the wiper blade is greater than or equal to a distance threshold, then the travel distance is long, when the travel distance of the wiper blade is less than the distance threshold, then the travel distance is short, and a predetermined period used in a case in which the travel distance of the wiper blade is long is set shorter than a predetermined period used in a case in which the travel distance of the wiper blade is short.

8. The wiper control device of claim 4, wherein when the travel distance of the wiper blade is greater than or equal to a distance threshold, then the travel distance is long, when the travel distance of the wiper blade is less than the distance threshold, then the travel distance is short, and a predetermined period used in a case in which the travel distance of the wiper blade is long is set shorter than a predetermined period used in a case in which the travel distance of the wiper blade is short.

9. The wiper control device of claim 1, wherein, when the wiper blade reaches a reversal position or a stowed position after the controller reverses the direction of the wiper blade, the controller is configured to stop controlling the rotation of the wiper motor.

10. The wiper control device of claim 2, wherein, when the wiper blade reaches a reversal position or a stowed position after the controller reverses the direction of the wiper blade, the controller is configured to stop controlling the rotation of the wiper motor.

11. The wiper control device of claim 3, wherein, when the wiper blade reaches a reversal position or a stowed position after the controller reverses the direction of the wiper blade, the controller is configured to stop controlling the rotation of the wiper motor.

12. The wiper control device of claim 4, wherein, when the wiper blade reaches a reversal position or a stowed position after the controller reverses the direction of the wiper blade, the controller is configured to stop controlling the rotation of the wiper motor.

13. The wiper control device of claim 5, wherein, when the wiper blade reaches a reversal position or a stowed position after the controller reverses the direction of the wiper blade, the controller is configured to stop controlling the rotation of the wiper motor.

* * * * *